United States Patent [19]

Aguro et al.

[11] Patent Number: 5,150,424
[45] Date of Patent: Sep. 22, 1992

[54] ON-LINE CHARACTER RECOGNITION APPARATUS

[75] Inventors: Masayuki Aguro; Hidekazu Tanaka, both of Tokyo; Kimiyoshi Yoshida, Kanagawa; Akio Sakano, Ibaraki, all of Japan

[73] Assignee: Sony Corporation, Tokyo, Japan

[21] Appl. No.: 621,017

[22] Filed: Nov. 29, 1990

[30] Foreign Application Priority Data

Dec. 4, 1989 [JP] Japan ................... 1-314956

[51] Int. Cl.⁵ .............................. G06K 9/00
[52] U.S. Cl. ......................... 382/13; 382/36
[58] Field of Search ............ 382/13, 3, 30, 36; 178/18; 364/709.11

[56] References Cited

U.S. PATENT DOCUMENTS

| | | | |
|---|---|---|---|
| 4,685,142 | 8/1987 | Ooi et al. | 382/13 |
| 4,827,530 | 5/1989 | Yamaguchi et al. | 382/13 |
| 4,944,022 | 7/1990 | Yasujima et al. | 382/14 |

FOREIGN PATENT DOCUMENTS

| | | | |
|---|---|---|---|
| 0114388 | 6/1986 | Japan | 382/13 |
| 0024382 | 2/1987 | Japan | 382/13 |

Primary Examiner—Leo H. Boudreau
Assistant Examiner—Andrew W. Johns
Attorney, Agent, or Firm—Philip M. Shaw, Jr.

[57] ABSTRACT

A character recognition apparatus is comprised of an input device for obtaining hand-written informations, a character dictionary memory for storing characteristics of characters and symbols, a character recognition device for determining character or symbol of the hand-written informations in association with characteristics of characters and symbols stored in the character dictionary memory, a group table memory for storing group tables of characters and symbols, a display device for displaying thus recognized character or symbol and associated character or symbols, if the recognized character or symbol is registered in the group table memory and a device connected to the group table memory for changing group tables of the group table memory.

4 Claims, 6 Drawing Sheets

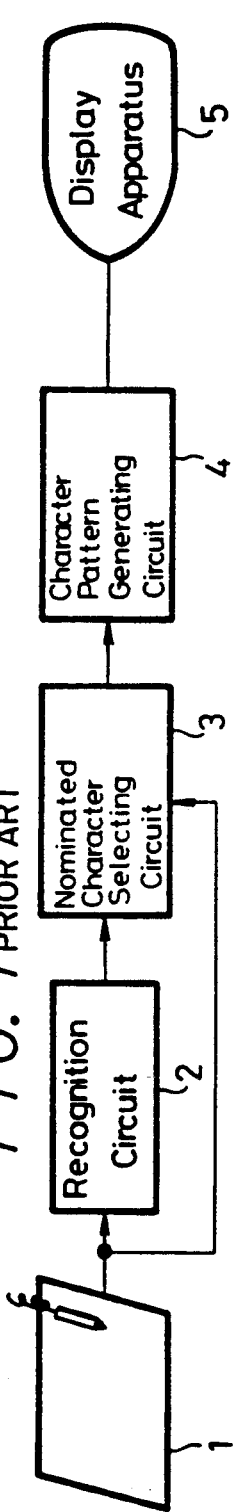
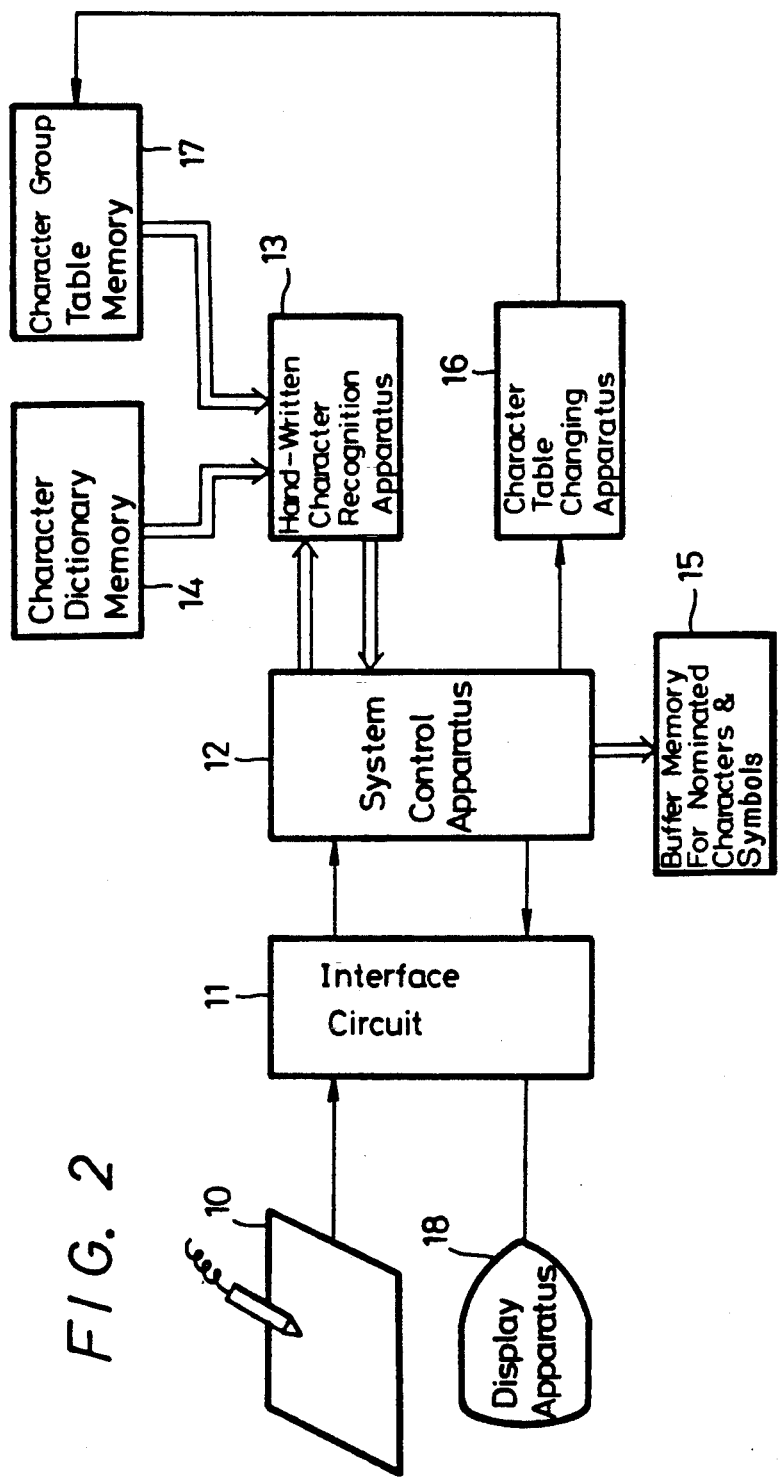

FIG. 4A Symbols

FIG. 4B Japanese Characters

FIG. 4C  ƒƒ  ƒ  #  ♭  ♪

ON-LINE CHARACTER RECOGNITION APPARATUS

BACKGROUND OF THE INVENTION

1. Field of the Invention

The present invention relates generally to on-line character recognition apparatus and, more particularly, to an on-line character recognition apparatus having a group table memory in which characters and symbols can be associated with nominated characters and symbols.

2. Description of the Prior Art

FIG. 1 is a block diagram showing an outline of a conventional hand-written character recognition apparatus.

In FIG. 1, reference numeral 1 designates a tablet, 2 a recognition circuit, 3 a nominated character selecting circuit, 4 a character pattern generating circuit and 5 a display apparatus. According to the prior-art hand-written character recognition apparatus, as shown in FIG. 1, a hand-written character written on the tablet 1 is processed by the recognition circuit 2 and one or a plurality of nominated characters and symbols are thereby extracted for the hand-written character. A character code train of the nominated characters is supplied to the nominated character selecting circuit 3. The nominated character selecting circuit 3 selects a character code of the first position of nominated characters from the character code train supplied thereto, and the selected character code is supplied to the character pattern generating circuit 4. The character pattern generating circuit 4 generates a character pattern corresponding to the character code and the character pattern is displayed on the display apparatus 5. In general, when the user wants to select another one of nominated characters and symbols while watching the contents displayed on the display apparatus 5, if the user depresses a key on the tablet 1, a nominated character selection control signal is supplied to the nominated character selected circuit 3 which then selects the next nominated character.

Incidentally, in the case of the conventional handwritten character recognition apparatus, when the hand-written character is recognized, the user must write a character with great accuracy and care because the recognition circuit must recognize a very small difference between a pair of similar hand-written characters.

For example, a great burden is imposed on the user when the user writes any of the following symbols ( { [ <, to write the symbol so that it is distinguishable from the other symbols by the recognition circuit.

Further, in order that all of these symbols can be distinguished by the recognition circuit, very small differences of these symbols must be distinguished and registered, which causes an increased recognition time and requires an increased capacity of the dictionary. Also, there is a restriction that the hand-written character can be recognized with accuracy.

Furthermore, a method for directly obtaining these characters and symbols from the JIS (Japanese Industrial Standards) code or for searching these characters and symbols from a table imposes a large burden on the user.

OBJECTS AND SUMMARY OF THE INVENTION

Accordingly, it is an object of the present invention to provide an improved character recognition apparatus which can substantially eliminate the aforenoted shortcomings and disadvantages encountered with the prior art.

More specifically, it is an object of the present invention to provide a character recognition apparatus having a reduced capacity dictionary memory.

It is another object of the present invention to provide a character recognition apparatus in which the recognition time can be reduced.

It is still another object of the present invention to provide a character recognition apparatus in which the recognition speed can be increased.

It is a further object of the present invention to provide a character recognition apparatus in which the description of character and symbol can be simplified so that time and labor can be saved.

It is yet a further object of the present invention to provide a character recognition apparatus whose application range can be enlarged.

As an aspect of the present invention, a character recognition apparatus comprises input means for obtaining hand-written information, character dictionary memory means for storing characteristics of characters and symbols, character recognition means for determining a first character or symbol from the hand-written information in association with characteristics of characters and symbols stored in the character dictionary memory means, group table memory means for storing group tables of characters and symbols, wherein each of the group tables is represented by a nominated character or symbol, display means for displaying the first character or symbol and one of the group tables representing the first character or symbol, if the first character or symbol is one of the nominated characters or symbols, and a group changing means connected to the group table memory means for changing group tables of the group table memory means.

In the preferred embodiment, the group changing means includes genre display means for displaying a selected genre of characters or symbols and means for adding a character or symbol to one of the group tables by selecting a character or symbol of a selected genre displayed by the genre display means. The groups changing means further includes means for deleting a character or symbol from one of the group tables by selecting a displayed one of the characters or symbols of the one of the group tables.

The preceding, and other objects, features and advantages of the present invention will be apparent in the following detailed description of an illustrative embodiment when read in conjunction with the accompanying drawings.

BRIEF DESCRIPTION OF THE DRAWINGS

FIG. 1 is a block diagram showing an example of a conventional character recognition apparatus;

FIG. 2 is a block diagram showing an embodiment of a character recognition apparatus according to the present invention;

FIGS. 4A-4C are schematic diagrams showing examples of group tables of characters and symbols, respectively;

DETAILED DESCRIPTION OF THE PREFERRED EMBODIMENT

Figure 3:
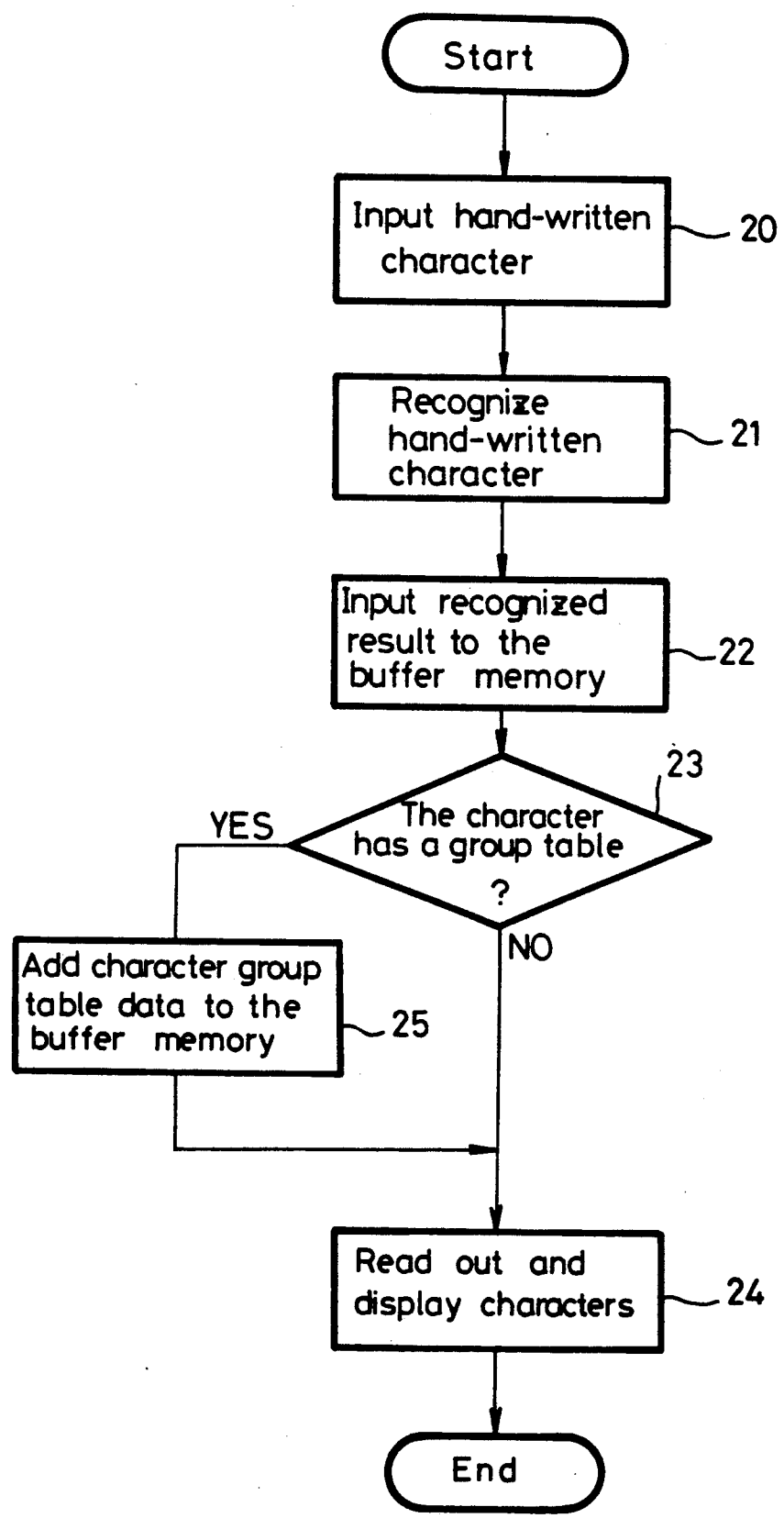
FIG. 3 is a flow chart to which references will be made in explaining the operation of the character recognition apparatus of FIG. 2.

An embodiment of a character recognition apparatus according to the present invention will hereinafter be described with reference to FIG. 2 to FIGS. 6A-6C.

FIG. 2 is a circuit block diagram showing an embodiment of the character recognition apparatus according to the present invention. In FIG. 2, reference numeral 10 designates a tablet, 11 an interface circuit, 12 a system control apparatus, 13 a hand-written character recognition apparatus, 14 a character dictionary memory, 15 a buffer memory for nominated characters and symbols, 16 a character table changing apparatus, 17 a character group table memory and 18 a display apparatus, respectively.

Character group tables shown in, for example, FIGS. 4A and 4B are provided in the character group table memory 17. As shown in FIGS. 4A and 4B, a group representing different series of characters or symbols are written on the leftmost portions of the character group tables and the corresponding series of characters or symbols similar to the group are written on the right sides of the leftmost portions respectively. It is needless to say that the character group tables are not limited to similar characters and symbols and characters and symbols which are not similar can be put into character group tables as shown in FIG. 4C.

Only these groups representing characters or symbols are registered in the character dictionary memory 14. When the user wants to output a desired character belonging to a certain character or symbol group, the user manually writes the group representing character on the tablet 10 and reads out data of a corresponding group table with reference to the character group table and selects desired character to be delivered so that this character is obtained instead of the group representing character.

A normal mode of the character recognition apparatus shown in FIG. 2 will be described with reference to a flow chart forming FIG. 3.

Referring to FIG. 3, following the Start of operation, the user enters a certain character on the tablet 10 in a manual fashion. The hand-written information is supplied through the interface circuit 11 to the system control apparatus 12 and is thereby processed. Then, corresponding stroke data is supplied from the system control apparatus 12 to the hand-written character recognition apparatus 13. In step 21, the hand-written character recognition apparatus 13 recognizes the hand-written character by comparing stroke data with the writing order or the like with reference to the character dictionary memory 14. In step 22, the recognized result is supplied to the nominated character buffer memory 15 through the system control apparatus 12 in the form of JIS code and evaluated point.

It is determined in the next decision step 23 by the system control apparatus 12 through the hand-written character recognition apparatus 13 with reference to the character group memory 17 whether or not the recognized character supplied to the nominated character buffer memory 15 has a character group table. If the character does not have any character group table as represented by a NO at step 23, the routine proceeds to step 24. In step 24, the nominated character is read out from the nominated character buffer memory 15 and is display on the display apparatus 18. If on the other hand the character has a group table as represented by a YES at step 23, then the routine proceeds to step 25. In step 25, the corresponding character group table data is read out from the character group table memory 17 and then added to the nominated character stored in the selected genre buffer memory 15. Then, the routine proceeds to step 24 whereat the nominated character and the accompanying character group table data are read out from the nominated character buffer memory 15 and displayed on the display apparatus 18.

When the user wants to select a desired character from the character group table data other than the first nominated character, the user must select the desired character. Then, the display apparatus 18 displays the character that the user selects instead of the first nominated character.

Since only the group representing characters are registered on the character dictionary memory 14 as described above, the storage capacity of the dictionary can be reduced, which provides a reduced recognition time and an increased recognition speed. Further, only the group representing characters are registered in the character dictionary memory 14 and other group characters need not be registered in the character dictionary memory 14 so that the description of the character can be made easy and simplified, which saves time.

A changing mode in which the contents of the character group table memory 17 shown in FIG. 2 are changed will be explained with reference to a flow chart forming FIG. 5 and schematic diagrams forming FIGS. 6A-6C.

Figure 6A:
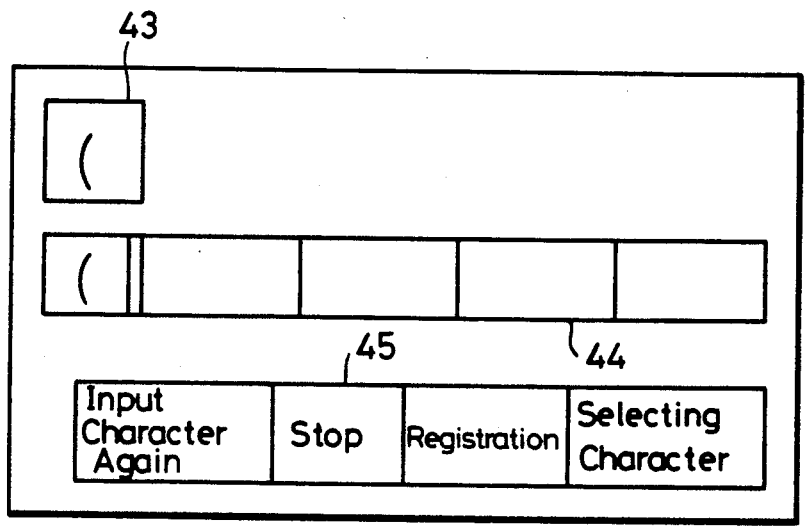
FIGS. 6A-6C are schematic diagrams used to explain the operation of the present invention, respectively.

If the character recognition apparatus of this embodiment is set in the changing mode, the displayed state of the display apparatus 18 is changed to a pattern shown in FIG. 6A. In FIG. 6A, a display portion 43 displays a hand-written character, a display portion 44 displays the content of the nominated character buffer memory 15 (see FIG. 2) and a display portion 45 displays menus. The menus are [input character again], [stop], [registration] and [character selection] as will be described later. Although [(] is already displayed on the display portions 43 and 44 at its portion in which characters of the first nominated character are displayed, as shown in FIG. 6A, for obtaining a better understanding of the present invention, [(] is not yet displayed in the initial state in actual practice.

Figure 5A:
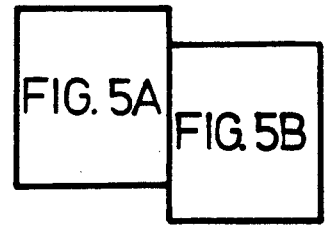
FIG. 5 (formed of FIGS. 5A and 5B drawn on two sheets of drawings to permit the use of a suitably large scale) is a flow chart to which reference will be made in explaining the operation of the character recognition apparatus of FIG. 2.
Figure 5:
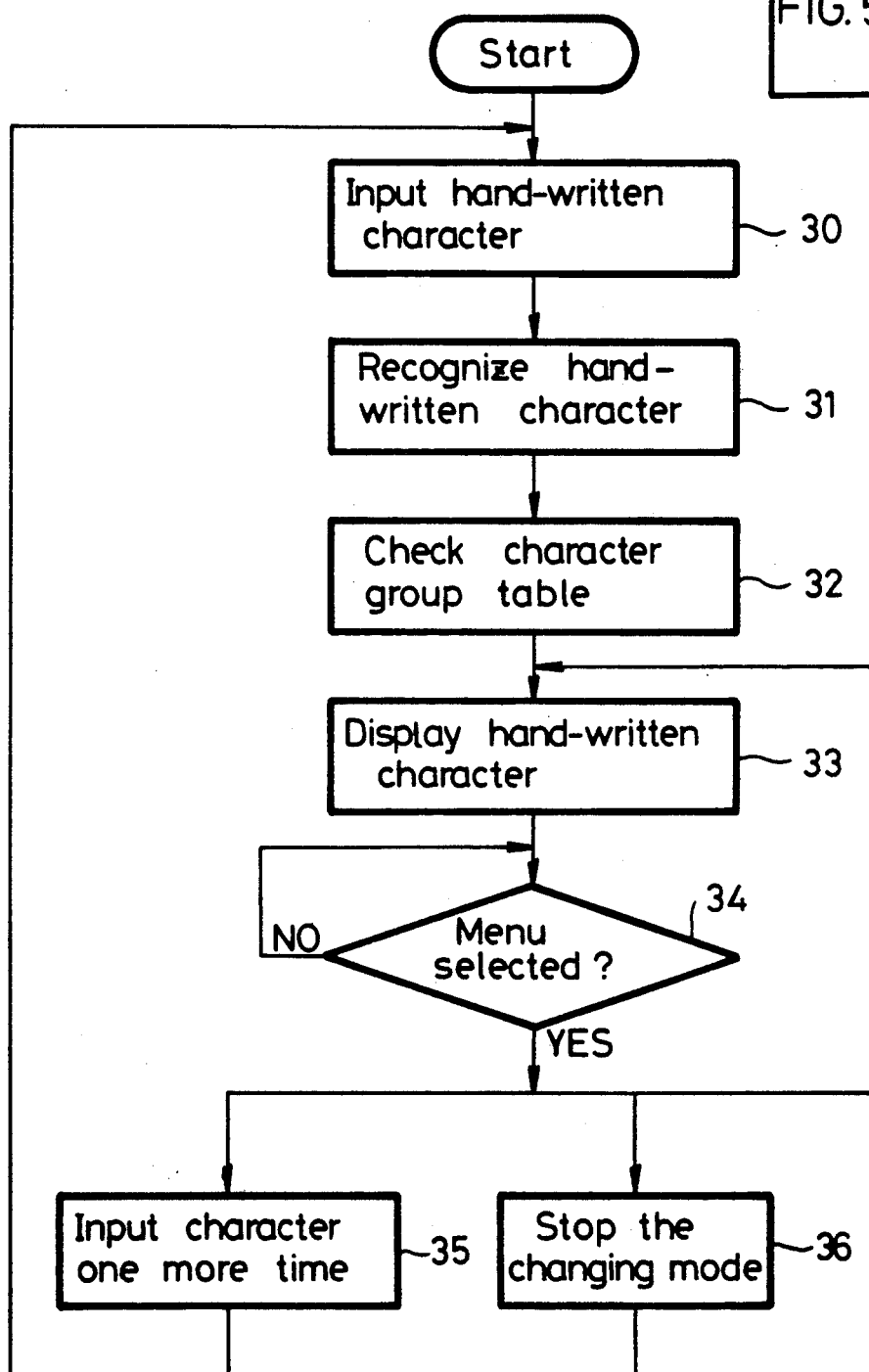
Figure 5B:
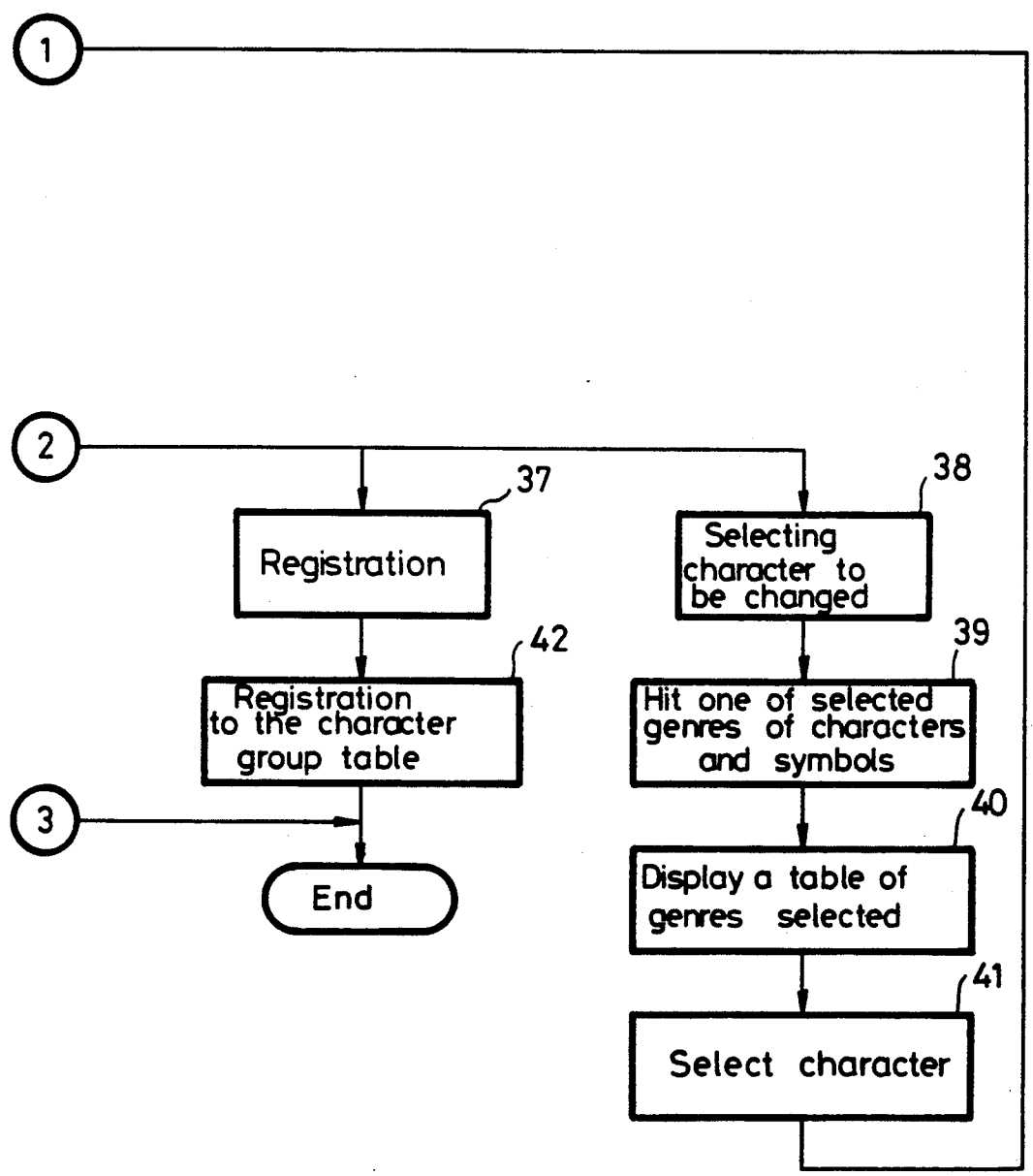

Referring to FIG. 5, following the Start of operation, in step 30, a character of, for example, [(] is entered and displayed on the display portion 43 by means of the input tablet 10. In the next step 31, the hand-written character is recognized by the hand-written character recognition apparatus 13 with reference to the character dictionary memory 14. A recognized result is supplied to and stored in the nominated character buffer memory 15. In the next step 32, the character group table of the character group table memory 17 is checked and the checked result is displayed at step 33 whereat the hand-written character [(] is displayed on the display portion 44 of FIG. 6A as the first nominated character. FIG. 6A shows the condition that the character is not yet registered in the character group table.

It is determined in step 34 by the character table changing apparatus 16 whether or not the menu is selected. If a NO is obtained at step 34, then the routine returns to step 34 and the step 34 is repeated until a YES is obtained. On the other hand, if a YES is obtained at step 34, the routine proceeds to the respective menus, that is, steps 35, 36, 37 and 38. In step 35, the character is entered one more time and a group representing character is determined. In step 36, the changing mode is stopped, and in step 37, a registration to a character group table is done. While, a selection of the character to be changed is done in the step 38.

Figure 6B:
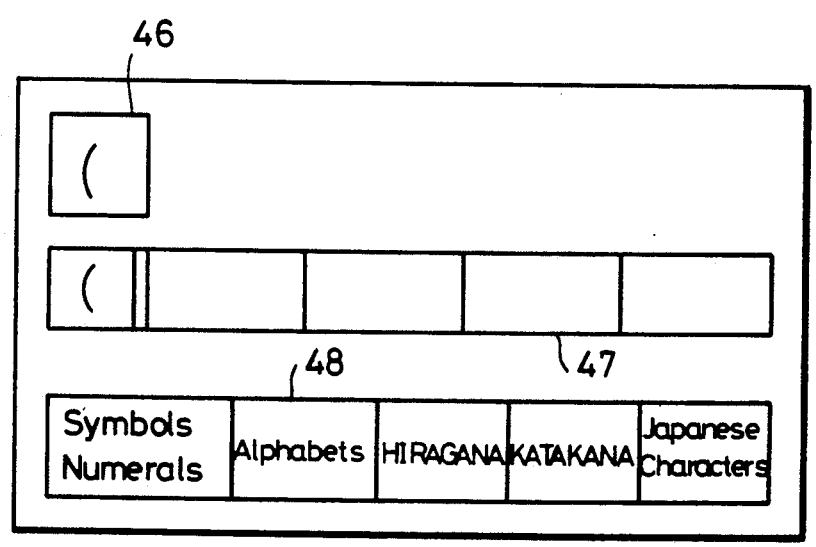
Figure 6C:
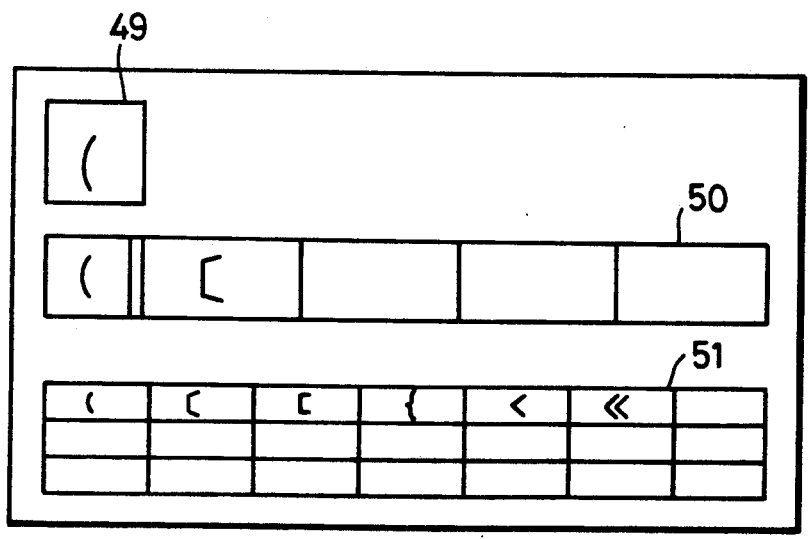

Incidentally, if the user hits [character selection] on the display portion 45 of FIG. 6A, the displayed condition of the display apparatus 18 is changed as shown in FIG. 6B. As shown in FIG. 6B, the display portions 46 and 47 perform the displays exactly the same as those of the display portions 43 and 44 in FIG. 6A. The display portion 48 displays thereon selected genres of characters and symbols. If the user hits one of the selected genres of characters and symbols, for example, [symbols and numerals] on the display portion 48 in step 39, a table of genres selected is displayed on a display portion 51 in step 40 as shown in FIG. 6C. In FIG. 6C, display portions 49 and 50 carry out displays exactly the same as those of the display portions 43 and 44 in FIG. 6A. If in step 41 the user selects one of the symbols, for example, [{] on the display portion 51, then data of this selected symbol is input to the nominated character buffer memory 15 and displayed on the display apparatus 18 in step 33. Accordingly, the display portion 50 in FIG. 5C displays thereon the character [{] after the first nominated character [(].

In a like manner, the character to be grouped is selected, stored in the nominated character buffer memory 15 and is displayed on the display portion 50.

After the character selection is ended, [registration] on the display portion 45 is selected in step 37 and the character recognition apparatus of this invention is set to the registration mode. In the next step 42, the character table changing apparatus 16 reads out the contents of the nominated character buffer memory 15 and registers the read-out contents to the character group table of the character group memory 17.

Under this condition, if the patterns of FIGS. 6A and 6B are displayed, the display portions 44 and 47 display thereon the character other than the first nominated character, for example, [{] and so on. If the user wants to delete a character of the grouped characters which are registered, then the user selects the character to be deleted from the grouped characters on the display portion 47 under the condition that the pattern of FIG. 6B is displayed, the thus hit character is erased from the display and the content of such character also is erased from the nominated character buffer memory 15. When the user hits [registration], data of such character is deleted from the character group table of the character group table memory 17.

As described above, the character group table of the character group table 17 can be made freely and desired characters and symbols or the like can be registered freely.

As described above, according to the present invention, since the grouped character accompanying with the nominated character which results from recognizing input character, symbol or the like is output with reference to the character group memory, only the character and symbol which can become the nominated character and symbol are registered in the character dictionary memory, which provides a reduced capacity of dictionary and a reduced recognition time, thus the recognition speed is increased. Further, since only the group representing characters are written as character and symbol or the like, the description of the character, symbol or the like can be simplified, which can save time and labor. Furthermore, since the content of the character group table is changed, a desired character group table for the user can be made freely, which provides an enlarged application range of this character recognition apparatus.

Having described a preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

We claim as our invention:

1. A character recognition apparatus comprising:
    a) input means for obtaining hand-written information;
    b) character dictionary memory means for storing characteristics of characters and symbols;
    c) character recognition means for determining a first character or symbol from said hand-written information in association with characteristics of characters and symbols stored in said character dictionary memory means;
    d) group table memory means for storing group tables of characters and symbols, wherein each of the group tables is represented by a nominated character or symbol;
    e) display means connected to the character recognition means and the group table memory means for displaying the first character or symbol and one of the group tables representing the first character or symbol, if said first character or symbol is one of the nominated characters or symbols; and
    f) a group changing means connected to said group table memory means for changing group tables of said group table memory means.

2. The character recognition apparatus of claim 1, wherein said group changing means includes genre display means for displaying a selected genre of characters or symbols.

3. The character recognition apparatus of claim 2, wherein said group changing means includes means for adding a character or symbol to one of the group tables by selecting a character or symbol of a selected genre displayed by said genre display means.

4. The character recognition apparatus of claim 1, wherein said group changing means includes means for deleting a character or symbol from one of the group tables by selecting a displayed one of characters or symbols of said one of the group tables.

* * * * *